United States Patent Office 3,741,947
Patented June 26, 1973

---

3,741,947
POLYMERIZATION AND COPOLYMERIZATION OF ARYL-SUBSTITUTED OLEFINS CONTAINING HALOGEN IN THE NUCLEUS
Erwin Schrott, Gerhard Bier, and Albert Gustav Martin Gumboldt, Frankfurt am Main, Germany, assignors to Hercules Incorporated, Wilmington, Del.
No Drawing. Filed Jan. 14, 1959, Ser. No. 786,683
Claims priority, application Germany, Jan. 16, 1958, F 24,823
Int. Cl. C08f 7/02
U.S. Cl. 260—91.5        2 Claims

ABSTRACT OF THE DISCLOSURE

New isotactic polymers of halophenylalkenes are produced by using as the polymerization catalyst a titanium trichloride produced by reducing titanium tetrachloride with ethyl aluminum sesquichloride at 0° C., then heating it at 100° C. and finally activating it with diethylaluminum chloride. Among the new crystalline polymers described are poly-4-(para-chlorophenyl)-butene-(1); poly-4-(3,4-dichlorophenyl)-butene-(1); and copolymers of halophenylalkenes with 1-olefins.

---

The present invention relates to the polymerization and copolymerization of aryl-substituted olefins containing halogen in the nucleus.

Polystyrene is known to be a very important raw material for making plastics. This raw material has been modified by various processes and has been partially replaced by copolymers rich in styrene. Polymers and copolymers of high molecular weight have also been made from α-alkyl styrenes and more especially from α-methylstyrene

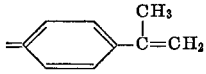

There have also been polymerized styrenes substituted in their nuclei, such as para-methylstyrene or para-chlorostyrene, to obtain plastic materials of high molecular weight. More recently, it has been described to prepare isotactic polystyrene (Belgian Patent 546,216), and crystalline polymers could also be obtained from the higher styrene homologs, allylbenzene, 4-phenyl-butene-(1) etc. (U.S. Patent 2,842,531). While isotactic polymers, as is known, could not be produced hitherto from halogen-containing, purely aliphatic monoolefins, Belgian Pat. 555,252 describes the polymerization of styrenes alkylated or halogenated in the aromatic nucleus whereby high-melting and partially crystalline polymers are obtained.

There has, however, not been described the preparation of high molecular weight substances on the basis of halogenated allylbenzene, 4-phenyl-butene-(1) and the like, concisely allyl compounds carrying aryl radicals as substituents in a position other than in the 2-position to the double bond, wherein the aryl radicals are substituted by one or more halogen atoms.

In recent years novel activator systems have been found which allow of making hitherto unknown polymers, such as polypropylene of high molecular weight. Especially the Ziegler type catalysts are widely used which enable ethylene, propylene and higher olefins to be transformed into high molecular weight substances under relatively mild conditions. The Ziegler type catalysts comprise two components, namely an organo-aluminum compound which may contain halogen, such as diethyl-alumium-monochloride, and a compound of a heavy metal of groups IV to VIII of the Periodic Table, such as titanium tetrachloride. G. Natta (G. Natta et al., Gazz. Chim. Ital., 87, 528) has proposed to use for polymerizing these higher olefins a combination of inorganically prepared TiCl₃ with aluminum triethyl in the place of sub-group compounds of lower valency obtained by means of organo-metal reduction (Ziegler).

For the polymerization of styrenes alkylated or halogenated in the nucleus Natta uses a catalyst which is prepared in the polymerization vessel by mixing together AlR₃, wherein R repersents an ethyl group, and TiCl₃ (Belgian Pat. 555,252).

Halogen-containing olefins of the arylallyl type when polymerized as described by K. Ziegler and G. Natta gave only very poor results. The polymerization yields primarily low molecular weight polymers, involves side-reactions, obviously nucleus alkylations, or yields only traces of polymer even after many hours of reaction or leads to viscous mixtures which are difficult to define.

The present invention provides a process for the manufacture of macromolecular substances suitable for making shaped bodies from an olefin with the aid of a Ziegler-type catalyst, which comprises reacting titanium tetrachloride and an organo-aluminum compound at a temperature between −20° C., and +40° C. to produce a solid catalyst, isolating the solid catalyst, subsequently treating the catalyst at a temperature between 40° C. and 150° C., and activating the so treated catalyst with aluminum diethyl monochloride during the subsequent polymerization of an olefin of the formula:

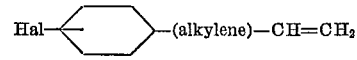

wherein

represents a phenyl radical containing up to 5 halogen atoms as substituents and -(alkylene)-represents a hydrocarbon radical containing 1–16 carbon atoms. The manufacture and use of isolated reaction products from, for example, titanium tetrachloride and an organo-aluminum compound as components of the Ziegler type catalyst system have been described, for example in German Pat. 1,019,466.

In the above formula alkylene may represent the following radicals, for example:

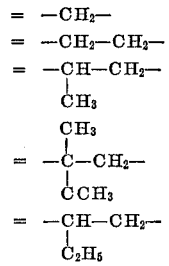

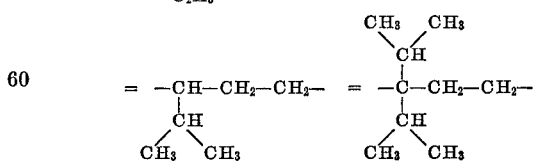

As activators there may suitably be used, especially when an isolated catalyst is employed, dialkyl-aluminum-halogen compounds, wherein alkyl represents preferably an ethyl, propyl or isobutyl radical. In carrying out the process of this invention it is preferred to use a catalyst which has been prepared from TiCl₄ and aluminum alkyl compounds or, preferably halogen alkyl compounds at room temperature or at a lower temperature and which has been subjected to thermal after-treatment at a temperature between 50° and 150° C. It has been found that the catalysts as used in this invention are more suitable for the manufacture of the herein described olefins having halogenated aromatic substituents than are the catalyst systems of the Ziegler type used for polymerizing ethylene (Belgian Pats. 533,362, 534,792, and 534,888), or the catalyst systems used for polymerizing propylene (Montecatini and Ziegler; Belgian Pats. 538,782 and 543,752), or the inorganically prepared $TiCl_3$ often recommended by G. Natta. The catalysts as used in this invention enable isotactic polymers to be obtained in a good yield per unit of volume and time from halogenated aryl-substituted olefins. The isotactic polymers so obtained have, for example, the following crystallite melting points:

° C.
Poly-4-(3,4-dichlorophenyl)-butene-(1) _____ 140–151
Poly-4-(para-chlorophen-yl)-butene-(1) _____ 155–167

Polymers of 5-phenylpentene-(1) halogenated in the nucleus are rubber-like products of high molecular weight.

The halogen-containing olefins, the polymers of which are described in this invention, may be prepared by various methods. Thus, for example, nuclei-halogenated derivatives of 4-phenylbutene-(1) may be obtained by reacting a corresponding halogen-benzyl-magnesium-chloride with allyl chloride or bromide. Alternatively they may also be obtained by reacting a halogen-benzyl-chloride with allyl chloride and zinc.

4 - (para-chlorophenyl)-butene-(1), for example, may be polymerized in a very good yield already at room temperature. The polymer so obtained has an insoluble portion of, for example, about 88%. It is especially emphasized that polymers obtained from monomeric compounds containing not more than 2–3 carbon atoms between the halogen-substituted aromatic nucleus and the olefinc double bond, can be made into very tenacious clear films which are especially interesting due to their high softening point of 140–250° C.

Furthermore, the polymers may be made into filaments of high strength by the melting-spinning method. These products are very interesting for the manufacture of fibers insofar as the halogen which they contain can be replaced by a known basic group, such as $-NH_2$, $>NH$, $-N<$. The resulting fibers which contain basic groups can be dyed using a known acid dyestuff.

The readiness to polymerize of the halogen-containing aryl-substituted olefins depends partially on the position of the halogen atom in the aromatic radical. Thus, for example, 4-(para-chlorophenyl)-butene-(1) and 4-(3,4-dichlorophenyl)-butene-(1) can vary readily be polymerized in a good yield, while chlorine in the aromatic radical which is in the orthoposition to the side chain complicates the polymerization.

The aforesaid halogen-containing and aryl-substituted olefins as used in this invention may also be made into copolymers with other olefins, such as ethylene, propylene and other alkyl- or aryl-substituted olefins. As examples of alkyl- or aryl-substituted copolymer components there may be mentioned more especially:

butene-(1)               $CH_3-CH_2-CH=CH_2$
3-methybutene-(1)        $CH_3-CH-CH=CH_2$
                              |
                             $CH_3$
4-methylpentene-(1)      $CH_3-CH-CH_2-CH=CH_2$
                              |
                             $CH_3$
4,4-dimethylpentene-(1)       $CH_3$
                              |
                         $CH_3-C-CH_2-CH=CH_2$
                              |
                             $CH_3$
4-methylhexene-(1)       $CH_3-CH_2-CH-CH_2-CH=CH_2$
                                    |
                                   $CH_3$
4-ethylhexene-(1)        $CH_3-CH_2-CH-CH_2-CH=CH_2$
                                    |
                                   $C_2H_5$ styrene 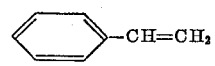

allylbenzene 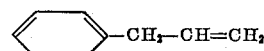

4-phenylbutene-(1) 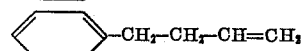

3-phenylbutene-(1) 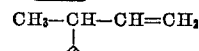

Copolymers with styrene are especially interesting since they do not show the brittleness which is characteristic of polystyrene.

The isotactic polymers obtainable by the process of this invention contain always a certain proportion (up to 10%) of amorphous product, which may remain in the crystalline product or may be separated depending on the process used and on the properties which the polymer shall have. The amorphous portion may be separated from the crystalline product by filtration or extraction with various solvents.

Solid polymers and copolymers may be produced in accordance with this invention under the most varied reaction conditions. The reaction may be carried out at 0° C. and atmospheric pressure or, for example, at 100° C. and under a pressure of about 200 atmospheres. The reaction may also be carried out under even more extreme conditions, but this is not necessary in view of the great activity of the catalyst and the great readiness of the monomers to polymerize. Moreover, it is a well known fact that in a stereospecific polymerization the relative proportion of isotactic polymer decreases as the polymerization temperature increases.

Besides, there is reason to believe that in a polymerization process carried out at a high temperature of 75–120° C., the halogen contained in the monomer undergoes reaction with the catalyst components.

In carrying out the process of this invention it is not absolutely necessary but often advantageous to use an inert dispersing medium since in this case the polymer is obtained in the form of a fine powder. As dispersing media there may be used more especially: hydrocarbons, such as butane, pentane, hexane, heptane, octane or mixtures thereof, petroleum fractions, such as benzine and diesel oil boiling between 120° C. and 250° C., and also halogenated aromatic substances, such as chlorobenzene or chlorocyclohexane. The dispersing media used should be free from groups containing oxygen, such as hydroxyl or keto-groups; furthermore, they should not contain, as far as possible, dissolved oxygen and they must be absolutely dry.

The following examples serve to illustrate the invention, but they are not intended to limit it thereto:

EXAMPLE 1

A pressure bottle made of glass was charged, in a nitrogen atmosphere, with 15 grams of 4-(para-chlorophenyl)-butene-(1), 15 grams of heptane, 2 millimols of $TiCl_3$ catalyst produced according to the process described earlier in the specification through reduction of $TiCl_4$ with ethyl aluminum sesquichloride in an inert diluent at 0° C., subsequent isolation, and heating of the separated product for four hours at 100° C. and 4 millimols of di-ethyl-aluminum-monochloride, and the bottle was closed well. The contents of the bottle was then stirred for 18 hours at 50° C. with a magnetic stirrer, the catalyst was decomposed with methanol and the polymer was worked up as described. 11.02 grams of poly-4-(para-chlorophenyl)-butene-(1) were obtained. By a two-hours extraction each with acetone, ethyl acetate and ether, 1.8 grams of amorphous product could be removed, i.e. 16.3% of the total yield. The poly-4-(para-chlorophenyl)-butene-(1) had a crystallite melting point of 155–167° C.

EXAMPLE 2

15 grams of 4-(3,4-dichlorophenyl)-butene-(1) were polymerized and worked up in the manner described in Example 1. 11.41 grams of polymer were obtained. The crystalline proportion was 10.51 grams=88.3%. The poly-4-(3,4-dichlorophenyl)-butene-(1) had a crystallite melting point of 140–151° C.

EXAMPLE 3

A four neck flask (capacity: 500 cc.) provided with a stirrer, a reflux condenser, a dropping funnel and a gas inlet was charged in a nitrogen atmosphere with 100 grams of heptane, 10 millimols of $TiCl_3$-catalyst and 20 millimols of diethyl-aluminum-monochloride. At a temperature of 50° C. and within 5 hours a mixture of 98 grams of styrene and 2 grams of 4-(para-chlorophenyl)-butene-(1) was added dropwise, and stirring was continued for a further 5 hours. During the entire period of time the apparatus was scavenged with nitrogen. The catalyst was decomposed with methanol and the polymer precipitated. After the usual work up, 57 grams of copolymer were obtained. By a four hours extraction with acetone 29.3 grams=51.4% of the product could be dissolved out and a further 3.1 grams=5.4% by a four hours extraction with ether. 24.6 grams=43.6% of the copolymer from styrene and phenylbutene (49:1) remained behind.

EXAMPLE 4

A four neck flask (capacity: 4 liters) provided with a stirrer, a reflux condenser, a dropping funnel and a gas inlet was charged with 1.5 liters of toluene, heated to 50° C. and saturated with propylene. 40 millimols of diethyl-aluminum-monochloride and 20 millimols of $TiCl_3$-catalyst were then added. A further amount of propylene was introduced within a further 5 hours at 50° C. and a mixture of 25 grams of 4-(para-chlorophenyl)-butene-(1) and 500 cc. of toluene was simultaneously added dropwise. The catalyst was decomposed with butanol and the suspension was repeatedly washed with hot water. 243 grams of copolymer were obtained by filtration and a further 36 grams of soluble polymer of low molecular weight were obtained by evaporating the mother liquor.

We claim:

1. A normally solid crystalline homopolymer of a compound having a general formula

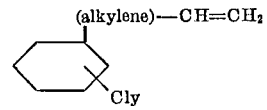

wherein -(alkylene)- is a hydrocarbon radical containing 1 to 3 carbon atoms and y is an integer of 1 to 5.

2. Homopolymers of

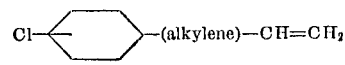

wherein

represents a radical selected from the group consisting of 4-chlorophenyl, 3,4-dichlorophenyl, and 3,4,5-trichlorophenyl, and alkylene represents a hydrocarbon radical containing from 1–3 carbon atoms, said polymers being crystalline substances with molecular weights of more than 50,000 and a melting range from 90° C. to more than 200° C.

References Cited

UNITED STATES PATENTS 3,091,601    5/1963    Reding et al. _____ 260—80.5

FOREIGN PATENTS 555,252    8/1955    Belgium.
844,944    8/1960    Great Britain _____ 260—91.5

JAMES A. SEIDLECK, Primary Examiner

S. M. LEVIN, Assistant Examiner

U.S. Cl. X.R.

260—80.78, 87.5 R, 93.5 R